United States Patent [19]
Swinson et al.

[11] Patent Number: 5,890,441
[45] Date of Patent: *Apr. 6, 1999

[54] HORIZONTAL AND VERTICAL TAKE OFF AND LANDING UNMANNED AERIAL VEHICLE

[76] Inventors: Johnny Swinson, deceased, late of Mineral Wells, Tex.; by Sueanne Walker, executrix, 516 A Hampton St., Clinton, Miss. 39056; Terry J. James, P.O. Box 872, Metter, Ga. 30439

[21] Appl. No.: 709,488

[22] Filed: Sep. 6, 1996

Related U.S. Application Data

[60] Provisional application No. 60/003,384 Sep. 7, 1995.

[51] Int. Cl.$^6$ .................................................... B64C 29/04
[52] U.S. Cl. ....................... 244/12.3; 244/12.1; 244/23 B
[58] Field of Search ................................ 244/12.3, 23 B, 244/12.1, 45 R, 45 A, 55

[56] References Cited

U.S. PATENT DOCUMENTS

| | | | |
|---|---|---|---|
| 1,291,354 | 1/1919 | Ambrose | 244/12.1 |
| 2,581,320 | 1/1952 | Burton et al. | 244/55 |
| 2,918,231 | 12/1959 | Lippisch | 244/23 B |
| 3,083,935 | 4/1963 | Piasecki | 244/12.3 |
| 4,254,619 | 3/1981 | Giffin et al. | 244/55 |
| 4,828,203 | 5/1989 | Clifton et al. | 244/12.3 |
| 5,407,150 | 4/1995 | Sadleir | 244/45 A |

FOREIGN PATENT DOCUMENTS

| | | | |
|---|---|---|---|
| 2922221 | 12/1980 | Germany | 244/23 B |
| 263084 | 5/1964 | Netherlands | 244/12.3 |

*Primary Examiner*—Charles T. Jordan
*Assistant Examiner*—Tien Dinh
*Attorney, Agent, or Firm*—Arthur F. Zobal

[57] ABSTRACT

A semiautonomously directed, autonomously controlled, gyroscopically stabilized, horizontal or vertical take off and landing (HOVTOL) flying apparatus employing two vertical lift devices equally and longitudinally spaced from the center of gravity of the apparatus; continuously integrated with a drive train apparatus, optional single or multiple power means; congruously connected thereto horizontal thrust devices. Integral to the vertical lift devices; pitch axis control devices situated at the exhaust orifices therein to vector said devices exhaust slip stream by a autonomous flight control system providing pitch stability. The autonomous flight control system providing continuously all flight control of the apparatus and said system being interfaced to a semiautonomous flight director device providing discrete flight direction function codes thereto. The combined effect of the apparatus is: When the power system rotates; coincident rotation of the drive train causes the vertical lift apparatus and horizontal thrust apparatus to counter rotate at right angles simultaneously providing both vertical lift and gyroscopic roll stability and simultaneously providing both horizontal thrust and gyroscopic yaw stability during flight; the continuous control thereof being accomplished by the autonomous flight control system and the directional steering, and function thereof in four axis effected by the semiautonomous flight director device which provides discrete flight function codes to the autonomous flight control system so as to disallow the initiation of negative flight maneuvers and/or functions providing for the safe unskilled pilot operation of the apparatus or any aircraft employing a autopilot having a autonomous digital flight control system.

10 Claims, 6 Drawing Sheets

HORIZONTAL AND VERTICAL TAKE OFF AND LANDING UNMANNED AERIAL VEHICLE

This application is a continuation-in-part of U.S. patent application Ser. No. 60/003,384 filed Sep. 7, 1995.

BACKGROUND AND DESCRIPTION OF THE PRIOR ART

Generally aircraft are divided into two major classifications, one is fixed wing and the second is rotary wing aircraft which are commonly referred to as helicopters. For purposes of substantiating the verity of the invention disclosed herein, comparing categories of prior art aircraft, the following to wit; (1) Wing fan lift aircraft (wing fan)—which are vertical take off and landing (VTOL) fixed wing aircraft that derive their vertical lift from fans, ducted fans, or propellers situated in their respective wings; (2) Tilt rotor/wing aircraft (tilt rotor/wing)—are fixed wing aircraft that have their propellers, rotors, ducted fans or jets situated at or near the tips of their wings or on the wings and said propellers, rotors, fans, wings, ducted fans, or jets are rotated ninety degrees to achieve VTOL flight transitions; (3) Jet assisted duct fans (jet assisted)—which are fixed wing VTOL aircraft employing jet engine or turbo fan engine thrust assisted fans or ducted fans. These aircraft have either their vertical lift augmented by jet or turbo fan thrust or the jet thrust is used to operate a vertical lift fan device in an enjoined manner; (4) Nozzle vectored jet thrust (jet thrust)—which are VTOL fixed wing jet aircraft that derive vertical lift from direct jet thrust channeled and directed by means of directional nozzles to achieve vertical lift and accomplish transitions; (5) Tail setters—a fixed wing VTOL aircraft that takes off vertically from an at rest vertical position standing on its tail and transitions to land the same way; whereby transitions are accomplished by rotating the entire aircraft ninety degrees to achieve VTOL transitions; (6) Various unusual VTOL aircraft.

The aviation industry has sought diligently to contrive an aircraft that can take off, land, and hover like a helicopter; without risk of stalling; and yet can also fly horizontally like a fixed wing airplane without the aerodynamic drag of a helicopter.

To date the closest that this goal has been met is with the Bell Helicopter V-22 Ospray VTOL aircraft. The V-22 is a fixed wing, tilt rotor, aircraft which takes off, lands, and hovers like a helicopter and rotates its' propulsion system 90 degrees to achieve horizontal flight like a fixed wing aircraft.

Other similar VTOL tilt rotor designs of prior art aircraft include the Bell Eagle Eye unmanned aircraft, Boeing Tracer Tilt Rotor unmanned aircraft, Bell XV-3, Curtis-Wright X-100 and X-19.

Tilt rotor prior art aircraft have five distinctive disadvantages. One is that the aircraft cannot land or take off horizontally like a conventional airplane if for some reason there was a failure of its' apparatus that rotates its' propulsion system while in the vertical flight mode. Another is due to their rotor diameters being so large that the rotors would strike the ground in a horizontal landing or take off scenario. Such a large rotor diameter is necessary however, in order for these aircraft to take off and land vertically.

The second disadvantage is that tilt rotor aircraft must overcome negative angular moments created by their spinning rotors when tilting their rotors 90 degrees during VTOL transitions. These forces act against the aircraft's fuselage creating a difficult control and stability phase for the pilot as the aircraft is transitioning in VTOL flight.

A third disadvantage of a tilt rotor aircraft is that they cannot fly at all if one engine should fail. The fourth disadvantage is one that is shared with helicopters in that tilt rotor aircraft, that do not employ jets or ducted fans, take a sizeable area to land in because of rotor diameter. A fifth disadvantage of tilt rotor aircraft, not employing jets or ducted fans, is also shared by helicopters which is exposed rotor blades that can strike nearby objects or people while landing and taking off.

Similar aircraft to the aforementioned are the U.S. ARMYS'/NASA Doak 16, the French NORD 500 and the Bell X-22; all are classed as tilt rotor aircraft in that the aircraft's propulsion systems are similarly rotated 90 degrees to achieve VTOL transitions. However, the X-22, the French NORD 500 and the Doak 16 employ ducted fans instead of rotors. This configuration allows the respective aircraft to land, take off, and hover like a helicopter and yet land and take off horizontally like a conventional fixed wing aircraft; they require less space in which to land and do not have exposed rotors.

The aforementioned tilt rotor ducted fan aircraft have two distinctive disadvantages. One is they likewise have negative angular moments acting against their fuselages to overcome when their respective propulsion systems are rotated 90 degrees during VTOL transitions. The second disadvantage is that they use ducted fans which, when employed in horizontal flight, limits their forward speed. The forward speed limitation of ducted fans is due to the fact that they build up a boundary layer of air immediately in front of the ducts at higher forward air speeds. This limits their forward airspeed to that of helicopters thus limiting their application on VTOL fixed wing aircraft.

Another type of VTOL aircraft known as tilt wing aircraft; as opposed to tilt rotor/ducted fans; are not true fixed wing aircraft. A few of the more well known tilt wing prior art aircraft are: The army/Navy VERTOL Model 76; the LTV/Hiller/Ryan XC142, which was based on the Hiller X18; and the Candair CL-84. These tilt wing aircraft, as the designation implies, tilt their wings 90 degrees with the propellers and engines attached to the wings to achieve VTOL flight transitions. However, they are generally accepted to be VTOL fixed wing aircraft as the wing is in a fixed position during horizontal flight.

Notwithstanding the moveable wing, they do take off and land, as well as hover, like a helicopter and transition to fly horizontally like an airplane. As with tilt rotor and tilting ducted fans, as aforementioned; tilt wing aircraft have to also overcome inherent negative angular moments when their wings are rotated 90 degrees to achieve VTOL flight.

Another problem with tilt wing designs is that the chance of a stall is greater than with tilt rotor or tilting ducts as tilt wing aircraft have a greater difficulty attaining aerodynamic lift on their wings for horizontal flight during part of the transition phase of VTOL flight.

Yet another type of fixed wing VTOL aircraft, known as tail setters, rest on their respective tails, vertically, and take off and land vertically on their tails. To achieve horizontal flight the entire aircraft rotates 90 degrees during VTOL flight transitions. The most notable of this type of prior art aircraft are the Convair XFY1 Pogo, the Lockheed XFV1, and the McDonnel Douglas Sparrow Hawk unmanned aircraft and the Bell X13 Vertiplane.

The most important short coming of tail setter VTOL fixed wing aircraft is the same as that of the tilt wing aircraft with respect to a lack of aerodynamic lift of the fixed wing during VTOL transitions and also having to overcome negative angular moments created by the gyro effect of their spinning propellers when rotated longitudinally from the angle of attack of the aircraft. The one exception being the Bell X13 Vertiplane which employed a jet engine. An additional; yet the most notable; draw back of a manned tail setter was a lack of pilot situational awareness during VTOL transitions.

Other examples of fixed wing VTOL aircraft employ vectored jet engine thrust as a means of providing vertical lift to hover and achieve VTOL flight.

The most notable of this type of prior art aircraft is the British harrier jet aircraft. These type of VTOL aircraft use the thrust of their jet engines vectored by rotating nozzles to accomplish VTOL flight and transitions.

Jet thrust type VTOL fixed wing aircraft have four notable drawbacks in that their jet engine thrust is of such a great magnitude that foreign objects kicked up by the jets tremendous thrust blast create hazardous conditions to both the aircraft and personnel on the ground near the aircraft's landing zone during VTOL landings and take offs. A second draw back is that in order for the aircraft to hover or take off vertically the aircraft's engines must be at or very near full throttle.

For a jet engine aircraft to accomplish hover flight and VTOL flight with full throttle, a tremendous amount of fuel is required thus diminishing the aircraft's horizontal flight time and range. The third disadvantage is the cost of providing such an aircraft due to the complexity of providing hover flight stability and the cost of a specialized jet engine for vertical flight.

Additional examples of employing jet thrust for vertical lift are disclosed in U.S. Pat. No. 3,972,490 issued Aug. 3, 1976 to Vincent H. Zimmermann et al and U.S. Pat. No. 4,171,112 issued Oct. 16, 1979 to Harry M. Harvy of England. The aircraft of U.S. Pat. No. 3,972,490 is a hybrid version combining nozzle vectored jet thrust together with a single ducted fan. This concept is similarly disclosed in U.S. Pat. No. 5,290,428 issued May 11, 1993 to Paul M. Bevilaqua and Paul K. Shumpert. A variation to the aforementioned aircraft is disclosed in U.S. Pat. No. 3,912,201 issued Oct. 14, 1975 to Charles Bradbury of England.

A variation of the above VTOL fixed wing aircraft is depicted as employing a combination of jet thrust and ducted fans as disclosed in U.S. Pat. No. 2,940,691 issued on Jun. 14, 1960 to Constant V. David, and U.S. Pat. No. 3,161,374 issued on Dec. 15, 1964 to Robert W. Allred et al. These last two prior art aircraft have one thing in common in that they both have their vertical lift fans in their wing area. These types of configurations, employing lift fan wings, create a distinctive draw back as will be discussed in the following aircraft prior art disclosures.

A classification of fixed wing VTOL aircraft, generally accepted as being known as lift fan wing aircraft, derive their vertical lift from fixed immovable ducted fans or propellers situated inside the wing area of the aircraft. These aircraft have one distinctive characteristic among them. The area of their wings displaced by the in wing fans severely limit the wings horizontal flight lifting capability due to drag.

The drag of a lift fan wing results from thicker wings required to accommodate the fans and a reduction of wing lift due to the slip stream air over their wings in horizontal flight being disturbed while the fans are in operation.

The only known in the wing lift fan aircraft to work operationally is the Ryan XV-5A and the Lockheed Hummingbird; both are similar to the prior art aircraft disclosed in U.S. Pat. No. 3,080,137. These concepts augment the in wing lift fans' lift by piping jet thrust to them. Another in the wing lift fan aircraft, that was to also augment its' lift by piping jet thrust to their fans, is disclosed in U.S. Pat. No. 3,161,374 but never known to fly.

Other in the wing lift fan concepts of prior art are disclosed in U.S. Pat. Nos. 2,939,649; 3,083,935; 4,125,232; 3,120,362 and 4,828,203; none of these concepts have been known to fly as of the date of this application.

Two prior art concepts disclosed in U.S. Pat. No. 3,559,921 issued Feb. 10, 1967 to Eugene L. Timperman, and U.S. Pat. No. 2,138,999 issued Dec. 6, 1938 to Wilmer W. Clark, show their vertical lifting apparatuses situated in the center body of the aircraft which is similar to the aircraft of U.S. Pat. Nos. 5,209,428; 3,912,201; 2,939,649 and U.S. Pat. No. 2,988,301 issued on Jun. 13, 1961.

In the Timperman patent, a single ducted fan is situated in the center of the aircraft's fuselage for vertical lift and driven by two engines; one in the front of the aircraft and one engine in the aft section of the aircraft. A transmission forward of the ducted fan transfers power to two wing mounted propellers for horizontal thrust.

Like the aircraft disclosed in U.S. Pat. No. 3,912,201; Timperman's aircraft employs thrust from the ducted fan piped to various locations of the aircraft to provide stability while in hover.

The departure of U.S. Pat. No. 3,912,201 from the Timperman disclosure is that the fans thrust is not augmented by jet thrust as is the case in U.S. Pat. Nos. 5,209,428; 3,912,201; and 2,939,649.

Without augmented thrust from some other source, a single ducted fan, proportionally shown in the Timperman disclosure, can not lift such an aircraft vertically according to current technology. However, such a concept could prove to be effective as a short take off and landing aircraft.

The prior art disclosed by Wilmer W. Clark in U.S. Pat. No. 2,138,999 discloses a vacuum lift device that is purported by the inventor to operate on vacuum forces and differences in atmospheric pressure principals that supposedly create a lifting force of several tons with two three foot diameter by three feet deep pressure differential devices.

While the Clark concept is intriguing, the disclosure was made far in advance of actual ducted fan research performed some 20 years later which has subsequently shown that the vacuum lift device is not technologically feasible as disclosed. Indeed, the vacuum lift device, so disclosed, does not have an open bottom; a physical requirement of any ducted fan. The device produces no thrust for vertical lift. It should be evident to the most casual observer upon reading the text of the Clark patent, that generating thrust was not Clark's intent.

The devices disclosed in Clark's aircraft is constructed similar to a modern day washing machine tub and agitator. The agitator is substituted by a multi-blade propeller having a three foot diameter, a three foot cord, and each blade being twisted about their ax's.

The Clark propellers rotate radially in an enclosed tub that is open only at the top. The Clark disclosure is not predicated on any known physical laws or principals as of the date of this application.

Unusual VTOL flying bodies that can not be classified as fixed wing aircraft nor helicopters are represented by the Sikorsky Cypher, the Canadair CL-227 Sentinel, and the General Dynamics Ring Wing Vehicle (RWV) among others; all three disclosed herein are unmanned aerial vehicles (UAVs). The Cypher UAV has a doughnut shaped fuselage with two contra rotating, articulated, rotor blades similar to a configuration used by some helicopters. The blades are situated within the center opening of the doughnut shape fuselage connected by a gear box and drive shaft which is situated at a fixed radius position laterally connected to a power means in the fuselage. The primary advantage of the Cypher is that it does not have exposed rotor blades and can land and take off like a helicopter.

However, the Cypher UAV has several disadvantages. One disadvantage is that the craft hovers all the time. Therefore, it must expend fuel at a higher rate than that of a helicopter or an airplane as little lift is afforded the craft in horizontal flight. As a result of not having wings, the craft suffers a secondary disadvantage of severe controllability problems in horizontal flight. These two draw backs lead to a third disadvantage which is limited range for its' rated flight duration. The combined aforementioned disadvantages also limit the crafts' forward speed. Because the craft hovers all the time it suffers a low maximum altitude rating compared to that of other VTOL flying bodies and aircraft of proportionate size and weight. The Cypher is further disadvantaged by its design in that it has a very low payload carrying capability disproportionate to its' Reynolds class. Having no control surfaces, this aircraft is lacking in aerodynamic directional steering in forward flight.

A prior art aircraft similar to the aforementioned Cypher UAV, is the CL-227; having a somewhat like manner in providing vertical lift in that it has two articulating contra rotating rotors.

The CL-227s fuselage is elongated vertically with the power means in the center of the craft. The overall aircraft resembles the likeness of a flying peanut for which it has been nicknamed. The craft lands and takes off vertically like a tail setter VTOL aircraft/UAV and hovers all the time like the Cypher UAV. One advantage the CL-227 has over the Cypher prior art aircraft is that it is somewhat more controllable in direction during forward flight because its' rotors are exposed to the surrounding slip stream air which provides the craft with some ability, via the articulation of its exposed rotors, to control its direction by the action of slip stream air against its' rotor blades which act as control surfaces during forward flight.

The CL-227s exposed rotor blades excludes its' use in UAV commercial application authorization by the FAA. The CL-227 UAV has virtually the same disadvantages of the Cypher UTAV with the exception of controllability and payload carrying capability.

Like the CL-227 UAV prior art aircraft the General Dynamics Ring Wing Vehicle (RWV) is a VTOL UAV that lands and takes off on its tail like the earlier mentioned prior art tail setter aircraft. The RWV however, employs a ducted fan configuration employing thrust vectoring for directional control. The craft takes off vertically and then rotates its entire fuselage ninety degrees for horizontal flight applications, unlike the Cypher and CL-227 prior aircraft art, with landing being the reverse of this action. In horizontal flight mode, the duct of the ducted fan itself provides lift for the vehicle in horizontal flight and functions as a ring winged aircraft.

While the General Dynamics RWV UAV has no exposed rotor blades, a distinct advantage in commercial UAV applications, it must however, resolve the difficult flight dynamics of negative angular moments like tilt wing and tilt rotor prior art aircraft and the flight dynamic problems of the tail setter prior art aircraft limiting its' use in commercial applications as a UAV because of safety issues involving pilot situational awareness and controlling the craft during VTOL transitions.

A configuration entailing some of the attributes of the Cypher, and some from the RWV aforementioned prior art aircraft, is the manned VZ-9V Avrocar aircraft. Built under a Canadian and U.S. Army/Air Force contract, this prior art aircraft is similar in design to that of a fictional flying saucer. The craft is disk shaped and employs three jet engines for power.

A single ducted fan is situated in the center of the VZ-9V and used as the primary vertical lifting means. The ducted fan is powered by the jet engines. Control and forward motion of the craft is accomplished by thrust vectoring the three jet engines' thrust. The craft suffered from such extreme controllability problems however, that the project was cancelled.

The Piasecki Air Jeep is an example of unusual prior art aircraft that was developed and flown under US Army/Navy contracts between 1957 and 1962. The craft was constructed having a dual power means located at the center of its' fuselage. The power means drove a central gear box, likewise centrally located, which entailed a hydrostatic drive means. The hydrostatic drive means drove two, variably pitched, horizontally mounted, counter rotating, vertical lifting propeller means; one situated in live rear of the fuselage and one in the forward section thereof. Both propellers are shrouded by the crafts' fuselage.

Partial control stability and forward motion of the Air Jeep was accomplished by thrust vectoring. The thrust vectoring means is comprised of a series of thrust vectoring vanes concentrically and evenly situated around the exhaust orifices of the vertical lifting means in a star configuration. Roll, pitch, and yaw control was accomplished by a combination of articulation of the vertical lifting propellers in conjunction with the thrust vectoring vanes. This prior art craft had a number of disadvantages. As the craft hovered all the time, its' range was limited; a result of excessive fuel consumption. The craft derived all of its' forward motion from its' vertical thrust thus limiting its' forward speed. As the craft employed shrouded propellers as opposed to true ducted fans, no inherent gyroscopic roll control was effected due to the lower rotational speeds required of larger diameter shrouded propeller applications versus the higher rotational speeds allowed by the smaller diameter of a ducted fans' rotors.

Likewise, a disadvantage of the crafts' employment of shrouded propellers is that the diameter normally required in such vertical lift applications generally preclude its' application in a fixed wing aircraft due to the disproportionate width of the fuselage required to accommodate the large propeller diameter. Such a wide bodied fuselage would create a significant drag problem as to be efficiently applied to a fixed wing aircraft application. In a true ducted fan application however, duct depth and diameter as a function of its' blade chord, diameter, and number of blades employed, combine with higher rotational speeds to allow greater thrust in a smaller area over that of a shrouded propeller; this allows for a narrower more aerodynamic fuselage. An additional disadvantage of this prior art craft is the drive means, being hydrostatic, is complex and heavier than a direct drive design. This example of prior art drive train means did not lend itself to adding a horizontal thrusting means.

The Air jeep employed twin engines for a one engine out safety feature at low altitudes. A single engine failure at a moderate altitude however, was sufficient to terminate its' flight even with the remaining engine functioning. The craft can not auto rotate like a helicopter for a safe landing. Lacking wings, and horizontal thrusting means, it could not land horizontally like a twin engine fixed wing aircraft with a remaining engine functioning.

In regard to the prior art apparatuses respecting the Semiautonomous Flight Director device (SFD) invention disclosed herein; all require a skilled pilot. To one degree or another each prior art apparatus either augments skilled pilot operation directly, or affords a skilled pilot a means to better utilize a autopilot.

Flight control and situational awareness and the lack thereof for UAV pilots is of particular concern to UAV manufacturers and users alike, most specifically military and non-military government users. As of the date of this application over eighty five percent of all UAVs currently being flown in the world today will crash as a result of a UAV pilots' lack of situational awareness and the resulting loss of flight control over the UAV flown regardless of any given UAV pilots' skill and/or experience level. These two factors alone, according to current UAV mishap statistics, are of paramount importance to the Federal Aviation Agency (FAA) and the National Transportation -and Safety Board with respect to their authorization for use and implementation of UAV technology in the civilian and commercial aviation sectors.

Disclosed in U.S. Pat. No. 5,255,880 issued Oct. 26, 1993 to Woon Lyloc and David C. Pattison is a manual override apparatus which allows a skilled pilot to override autopilot operation in aircraft that have fly by wire or fly by light flight control systems as opposed to mechanical flight control systems having an autopilot system.

In this prior art device the pilot does not have to disengage the autopilot in order for a skilled pilot to make direct changes to the controls that are under direct autopilot command. The degree of change made by the action of a pilot displacing a given aircraft's manual control stick or yoke is sensed by a circuit when the pilot places a specific amount of force on the control stick or yoke. Once the amount of force level reaches a certain threshold, the amount and degree of deviation, in linear terms, of the pilots' control stick or yoke is subsequently sensed to allow a pilot to make flight control changes under autopilot command but only to the exact degree of deviation made in the pilots' control stick or yoke.

It is important lo note here, that in the application of this prior art device; only a skilled pilot having knowledge and sufficient skill in flying a particular aircraft under non-autopilot operation should make such deviations in the control stick or yoke of such an aircraft having the device and autopilot. The reason for this is that the amount of deviation made in the pilots' control stick is directly related and linearly proportionate to the amount and degree of linear and proportional change effected in the flight controls of the particular aircraft flown by the pilot.

This is to say that a pilot could place the control stick into a position and to such a degree that would cause the flight controls of the aircraft flown under autopilot command to likewise place said aircraft in a negative flight regime. This could result in the loss of aerodynamic control of the aircraft if it were not for the pilots' skill precluding the placing of the control stick in such a position as to cause a negative flight regime.

The advantage of the prior art device is it allows override control of the autopilots' flight controls of a aircraft having a fly by wire or fly by light flight control system whereby a skilled pilot may make changes directly to the flight controls coincident to direct command of an active autopilot governing said aircraft flight controls.

A disadvantage of this prior art device is that it is not applicable to aircraft having flight control systems other than fly by light or fly by wire flight control systems and the system requires operation by a skilled pilot.

U.S. Pat. No. 5,067,674 issued Nov. 26, 1991 to Albert Heyche, Alain Latteur, and Philippe Dekoninck, all of Brussels Belgium, discloses a control system for remote controlled aircraft, which is, in effect, a compensator for variations of time lags associated with the difference in time from the moment a pilot initiates an action by remote control until the aircraft in flight begins to act on the change with respect to the aircraft's resultant attitude change that follows the execution of the various interactions of the aircraft's flight control surfaces.

It is further disclosed in U.S. Pat. No. 5,067,674 that the device automatically compensates for variations in normal operation of a flight control system of a remotely controlled helicopter to prevent negative flight regimes. The prior art device aids, in an automatic manner, a skilled pilot in piloting a remotely controlled helicopter. The system does not however, supplant the skill normally required to pilot a remotely controlled aircraft or helicopter.

U.S. Pat. 4,964,598 issued Oct. 23, 1990 to Zacharaia Berejik, Ramot Tzahala; Allon Wallach, Moshav Talmei Elazar, of Israel discloses an apparatus to automatically stabilize, to a certain degree, a remotely control aircraft in yaw and roll for aircraft turns initiated by a pilot whereby the aircraft is required to bank in order to accomplish the turn.

The apparatus, also in like manner, provides automatic stabilization, to a certain degree, of the pitch of a remotely controlled aircraft for aircraft ascensions and descentions initiated by the pilot.

The apparatus however, does not supplant pilot skill, but rather is an aid to a skilled pilot that automatically compensates to a certain degree for the pilots' lack of situational awareness of the difference between what a pilot perceives to be the actual attitude of a remotely controlled aircraft versus the actual physical attitude of the remotely controlled aircraft when performing certain flight maneuvers. The apparatus does not preclude the pilots' placing the aircraft in a negative flight regime however.

The apparatus allows a skilled pilot to perform flight maneuvers that include negative flight regimes in order to allow a skilled pilot to accomplishacrobatic like flight maneuvers in such a way as to compensate to a limited degree for the lack of the pilots' situational awareness of the actual physical attitude of the remotely controlled aircraft with respect to the pilots' perception of the aircraft's attitude.

U.S. Pat. 4,642,774 issued Feb. 10, 1987 to John P. Ceyntala and Kenneth W. McElreath of Iowa is similar in function to the apparatus earlier mentioned herein and disclosed in U.S. Pat. No. 5,255,880.

The apparatus allows a pilot to make manual flight control deviations under autopilot control and then subsequently return to autopilot control of the aircraft to allow the autopilot to smoothly return to the autopilots' preprogrammed flight regime, or optionally, to a new program set determined by the manual flight control deviations initiated by the pilot.

The primary effect of this prior art device is in allow for over ride changes in an autopilots' control of an aircraft by a pilots' degree of linear displacement of the pilots' control stick either allowing the autopilot to return to its' preprogrammed flight path or alter the preprogrammed flight path in accordance with the degree of linear displacement of the pilot's control stick.

All actions therefore, being accomplished in such a way as to make flight control changes without abrupt flight dynamics resulting from the change initiated by the pilot. Both of the aforementioned prior art devices and the aforesaid prior art device disclosed in U.S. Pat. No. 5,255,880 require a skilled pilot versed in the manual flight operations of the particular aircraft flown and so equipped with said devices so as to preclude the manual placement of the pilots' control stick in such a positions as to cause a negative flight maneuver being initiated by the autopilot.

SUMMARY OF THE INVENTION

The invention relates to the fields of; aircraft in general, integrated aircraft propulsion systems, integrated aircraft drive trains and integrated flight control systems, employed either singularly or in combination thereof when embodied in a flying apparatus having: (1) a integrated propulsion means providing simultaneously and continuously both vertical lift, thrust, and horizontal thrust. (2) a control system employing congruent combinations of gyroscopic, electronic, mechanical, electro-mechanical and aerodynamic means of maintaining airborne platform stability during flight; (3) an airframe capable of; a optional multiple power means; being scaleable as to size; affording multiple wing configurations; optional propulsion means for horizontal flight only configurations, vertical flight only configurations or a combination of vertical and horizontal flight configurations; and affording optional deployment of the apparatus without aerodynamic control surfaces for stand alone non-aviation applications; (4) a integrated drive train means contiguously delivering power from the power means to the vertical and horizontal propulsion means while also simultaneously providing gyroscopic stability in the roll and yaw axis of a VTOL flying body; (5) a semiautonomous flight director device capable of providing directional steering of a flying apparatus in four axis in such a manner as to enable a unskilled pilot or operator to safely fly, operate, and navigate, any flying apparatus or aircraft employing a autopilot having a autonomous digital flight control system therein; whether manned or unmanned.

It is the object of the invention, either singularly or in combinations, to:

(A) Eliminate induced negative angular moment forces in VTOL aircraft from acting against a fuselage as encountered with tilt rotor, tilt wing, tilting ducted fan, or tail setter VTOL aircraft designs by designing, constructing, and configuring the drive train and propulsion system so as to eliminate the aerodynamic requirement to rotate the propulsion and/or drive train system, or fuselage in order to accomplish VTOL transitions.

(B) Provide a simplified apparatus in generating vertical lift and thrust with coincident horizontal thrust and gyroscopic stabilization in two axis.

(C) Improve VTOL flight stability by providing continuous horizontal thrust while simultaneously providing continuous vertical lift during VTOL transitionseliminating aerodynamic wing drag normally encountered in wing lift fan VTOL aircraft designs.

(D) Improve flight safety during critical VTOL flight transitions by employing inherent forces to control a flying body in yaw and roll rather than overcoming them; and reduce the chance of a aerodynamic stall by providing continuous sustaining vertical lift until wings can provide lift sufficient to keep a aircraft aloft unlike tilt wing/rotor or tail setter VTOL aircraft.

(E) Improve over all flight safety by reducing the skill required to fly and pilot any flying apparatus by providing a semiautonomous flight director device capable of significantly reducing a pilots' work load and substantially reducing the skill required lo fly any aircraft equipped with a autopilot having a autonomous digital flight control system; whether manned or unmanned.

(F) Reduce mechanical, electrical and electronic complexity; thereby reducing production and maintenance costs; thereby reducing acquisition costs.

The invention as depicted in FIG. 1 has significant commercial and military application in the unmanned aerial vehicle (UAV) market. As of the date of this application, Federal Aviation Administration (FAA) policy regarding commercial use of UAVs is very restricted. These restrictions are predicated on concerns of safety regarding the design of such UAV vehicles and their use by the general public.

With respect to safe operation of a UAV in a commercial application the FAA requires that certain safe operation attributes of a UAV design be demonstrated before authorization for its use in a commercial application is granted.

These concerns are:

(1)—No exposed rotor blades.
(2)—Pilot situational awareness.
(3)—Controllability and stability of the platform.
(4)—Interruption of the control data link (lost link).
(5)—Ease of operation.
(6)—Collision avoidance.

Upon further study of this application it shall be shown that the invention FIG. 1 and FIG. 2 as disclosed herein, addresses the aforementioned (1) through (5) FAA safety concerns inclusively.

As of the date of this application no other UAV design addresses five out of the six primary FAA UAV considerations for commercial UAV application approval.

The flying apparatus depicted in FIG. 3 is a stand alone attribute or the invention and has significant non-aviation application in a number of commercial industries without FAA approval.

An abbreviated list of such non-aviation applications are:

(1)—Platform for fire fighting and rescues.
(2)—Aerial observation platform for media or law enforcement.
(3)—Agricultural spraying.
(4)—Low altitude aerial fork lift.
(5)—Aerial crane.

The semiautonomous flight director (SFD) 58 device depicted in FIG. 2 is a stand alone attribute of the invention and likewise has significant application in the aviation industry for both unmanned and manned aircraft.

In the case of unmanned aircraft industry applications the SFD, separately, may be employed in any UAV application equipped with a autopilot having a autonomous digital flight control system. The SFD 58 affords any UAV aircraft so equipped to address the aforesaid FAA safety requirements of pilot situational awareness, controllability, and ease of operation. The SFD 58 further reduces any UAV pilots' workload in piloting operation of a UAV when employed with a autopilot having a autonomous digital flight control system (ADFCS).

In the case of manned aircraft industry applications the SFD can likewise significantly reduce a pilots' workload in piloting operations whereupon the aircraft piloted is likewise so equipped with a autopilot having a autonomous digital flight control system.

With respect to the overall aviation industry it is plausible to employ the SFD so as to significantly reduce the piloting skill and workload normally required to fly any aircraft so equipped with a autopilot having a autonomous digital flight control system (ADFCS).

PREFERRED DETAIL DESCRIPTION OF THE EMBODIMENTS OF THE INVENTION

Figure 1:
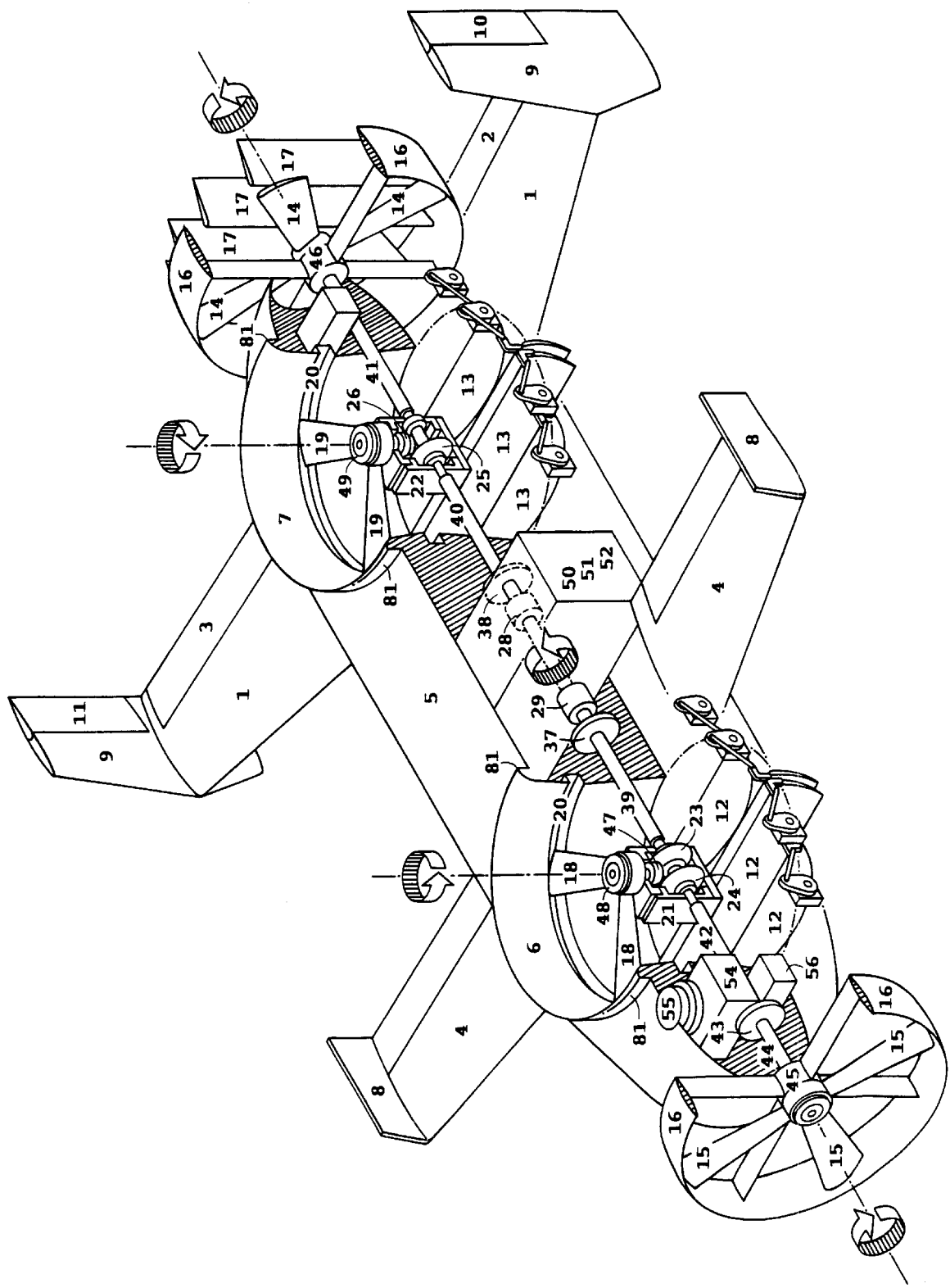
FIG. 1 depicts the invention as a autonomously controlled, semiautonomously and remotely directed, HOVTOL, unmanned aircraft for commercial and military applications capable of both horizontal and vertical flight and also landing and taking off vertically or horizontally.

FIG. 1 shows a flying body to be representative of the best mode of carrying out the invention. The flying body is more specifically identified as a (HOVTOL) Horizontal and Vertical Take Off and Landing, (UAV) Unmanned Aerial Vehicle designed with moderate drag for stability purposes in low to medium Reynolds applications.

The vehicle FIG. 1 has wings 1 and aerodynamic control surfaces 2 and 3. Forward independently articulated canard wings are shown at 4. The wings 1 and canards 4 are attached to a chine wide body fuselage 5 having two vertical thrusting ducted propfans 6 and 7; one 6 forward and equally spaced from the center of gravity of the fuselage and one 7 aft equally spaced from the center of gravity of the fuselage 5. The wings 1 and canards 4 are so situated and attached to the fuselage 5 so as to provide the craft with maximum horizontal flight stability with respect to the crafts's aerodynamic center of gravity.

The wings 1 and canards 4 employ NACA 747A315 airfoils for high lift. The canards 4 have slightly less surface area than the wings 1 to allow for a nose down stall, powerless glide, to landing conventionally, in case of total engine power failure.

Aerodynamic roll stability in horizontal flight is achieved by canard 4 tip fences 8 and a two degree dihedral of the canards 4 and a four degree dihedral of the wings I in combination with the articulation of the canards 4, and the aerodynamic control surfaces 2 and 3 of the wings 1.

Aerodynamic yaw stability in horizontal flight is achieved by two vertical stabilizers 9 employing NACA 0009 airfoils attached to the wines 1, one 9 at the outboard section of the starboard wing 1, and one 9 at the outboard section of the port wing 1; and by canting the leading edge of the vertical stabilizers 9 outboard by three degrees, and by canting the vertical stabilizers 9 top inboard by five degrees in concert and conjunction with articulation of the air control surfaces 10 and 11 of the vertical stabilizers 9, and the horizontal thrust vectoring vanes 17.

Horizontal flight turns are achieved by articulation of the vertical stabilizers 9 control surfaces 10 and 11 in conjunction with articulation of the aft pusher propellers' 14 thrust vectoring vanes 17 and a high positive angle of incidence on one appropriate canard 14 so as to effect a horizontal flight turn in a desires direction without banking.

Aerodynamic pitch stability in horizontal flight is achieved by a two degree negative angle of incidence of the wings 1 and a two degree positive angle of incidence of the canards 4 and mitigated at low airspeeds by thrust vectoring of the exhaust slip streams of the two vertical thrusting ducted propfans 6 and 7 by means of articulating vanes of same 12 and 13 and canards 4 Vanes 12, 13, are located beneath the two ducts respectively 6 and 7 in the exhaust slip stream thereof.

Horizontal thrust is achieved by means of an aft variable pitch pusher propeller 14 and/or forward variable pitch tractor propeller 15. Both propellers 14 and 15 may be employed in combination with aft directed vectored thrust of the vertical thrusting ducted fans 6 and 7 by means of vanes 12 and 13.

The pitch of propellers 14 and 15 are articulated by swash plate apparatuses 45 and 46 under ADFCS command via electro-mechanical means 59 and 60 in conjunction with said vectoring vanes 12 and 13, so as to achieve a desired forward air speed for a given flight scenario without stalling. Additional horizontal thrust and safety is provided by employing an optional shroud and/or a duct 16 around propellers 14 and 15.

Gyroscopic stabilization in the roll axis of the aircraft of FIG. 1 during hover flight and vertical flight and during transitions from vertical to horizontal flight and vise versa is achieved by the counter rotation of the vertical lilting devices propellers/fans 19 and 18 which when counter rotated at high speed becomes a gyrostabilizer for rolling moments allowing the aircraft to maintain a stable attitude in it's roll axis during vertical flight without complex thrust vectoring laterally or without piping thrust to various points outboard of the aircraft for roll control during vertical flight. Gyroscopic yaw stabilization during vertical and hover flight is achieved by the counter rotation of the forward and aft horizontal thrust propellers/fans 14 and 15 which when counter rotated become a gyrostabilizer for the yawing moments of the aircraft allowing for a stable attitude of the aircraft in it's yaw axis during hover and vertical flight.

A mechanically actuated centrifugal clutch apparatus 48 and 49 providing an optional means to automatically disengage the vertical lift propellers 18 and 19 in horizontal flight to reduce fuel consumption and load on the power means 50, 51 or 52, during horizontal cruise flight. Said clutches 48 and 49 being connected between said vertical lift propellers 18 and 19 respective propeller hubs and likewise respectively to vertical lift propeller shafts 47 and 26 of the respective ninety degree drive transmissions 21 and 22.

Operation of the clutches 48 and 49 and their respective interactions with the integrated propulsion drive train apparatus is such that when the aircraft is in the horizontal flight mode and the engine power means 50, 51, and 52 decreases in rotational revolutions per minute (RPM) to provide for aircraft horizontal cruise speed of the aircraft; such lower RPMs of the engine shall cause coincident lower RPMs at the ninety degree drive transmissions 21 and 22 respective propeller shaft gears 47 and 26 which shall decrease the centrifugal force at the clutches 48 and 49 which shall cause a automatic mechanical disconnection of the propellers 18 and 19 hubs from the drive transmissions 21 and 22 respective propeller drive gears 47 and 26.

Conversely, when the engines' RPM is increased to an RPM rate required for vertical lift requirements of any flight mode, shall cause a corresponding centrifugal force sufficient to cause the centrifugal clutches to mechanically engage the propeller drive shaft gears to the respective propeller hubs causing rotation or propellers 18 and 19 for vertical lift and thrust.

Turning the aircraft FIG. 1 around its' vertical axis during stationary hover flight is achieved by articulating forward propellers/fans 15 and aft propellers/fans 14 pitch angles by swash plate apparatuses 45 and 46 so as to cause an equal amount or thrust to be directed aft of the aircraft by the aft propeller/fan 14 to an equal amount of thrust expelled forward of the aircraft by the forward propellers/fans 15 providing reverse thrust while simultaneously articulating the aft horizontal thrust vectoring vanes 17 in a direction to achieve the desired turn around the aircraft's vertical axis during hover. The embodiment of the HOVTOL UAV FIG. 1 is the sum of; (A) a semiautonomous flight director (SFD) device FIG. 2, to provide direction in real time a industry typical autopilot which when interfaced to a industry typical autonomous digital flight control system (ADFCS) (employing a industry differential global positioning system) FIG. 6 by typical industry standard electrical interface means 83, in manned applications, or by a industry typical radio frequency data link 82 in the case or unmanned applications; and (B) an integrated propulsion means contiguously enjoined with an integrated drive train means FIG. 3.

The ADFCS (autopilot) 54 is interfaced by various electro-mechanical interface means 59 and 60, so as to cause appropriate and concerted articulation of either the variably pitched aft horizontal thrust propellers 14; and/or the forward variably pitched horizontal thrust propellers 15; the aft horizontal thrust vectoring vanes 17; so as to effect all horizontal thrust and vectoring for forward, reverse, and lateral rotational direction of the apparatus.

Likewise the ADFCS 54 is similarly interfaced by electro-mechanical interface 59 and 60, to the vertical thrusting ducted propfan devices 6 and 7 exhaust slip stream vectoring vanes 12 and 13 and so articulated in concert with the horizontal thrust means 15 and 14 in conjunction with the aft horizontal thrust vectoring vanes 17, to maintain pitch and yaw control necessary to maintain stable vertical flight and hover operation of the apparatus automatically while under the ADFCS 54 control.

Likewise vertical, horizontal and lateral direction, speed, rate of ascent or descent and hover modes are directed by an unskilled operator by manipulation of seven appropriate function switches 77 situated in the joy stick 78 and/or control console 61 of the SFD 58 in conjunction with appropriate manipulation of the joy stick 78 in such a way as to effect the operators' required direction, speed, rate of ascent or descent.

Flight direction, as opposed to flight control of a aircraft, required by the operator is interpreted by the SFD device 58 by way of sensing electronic signals from the joy stick 78 and control switches 77 and subsequently producing discrete logical direction autopilot reprogram flight control and function code signals to the autopilot 54 by which the ADFCS means by way of the autopilot 54 receives, in real time, way point direction, speed, and rate of ascent/descent reprogramming in a logical concerted preprogrammed manner as necessary to cause the apparatus to perform a SFD pre-specified flight direction and or functions initiated by a unskilled operator. Said SFD pre-specified flight direction codes are provided to the autopilot in real time causing by way of the ADFCS means of the autopilot 54 various concerted interactions by electro-mechanical interface means 59 and 60 the adjusting of vanes 12, 13, 17; propellers 14 and 15; and air control surface articulations of 2, 3, 4, 10 and 11; in such a preprogrammed coordinated manner as to effectuate the operators direction while simultaneously excluding any operator command that would cause a negative flight maneuver by automatically assuring appropriate direction and function codes to the autopilot for adequate vertical lift, horizontal thrust and stable night control of the apparatus and/or aircraft or suitable frame said apparatus may be so embodied therein.

Figure 3:
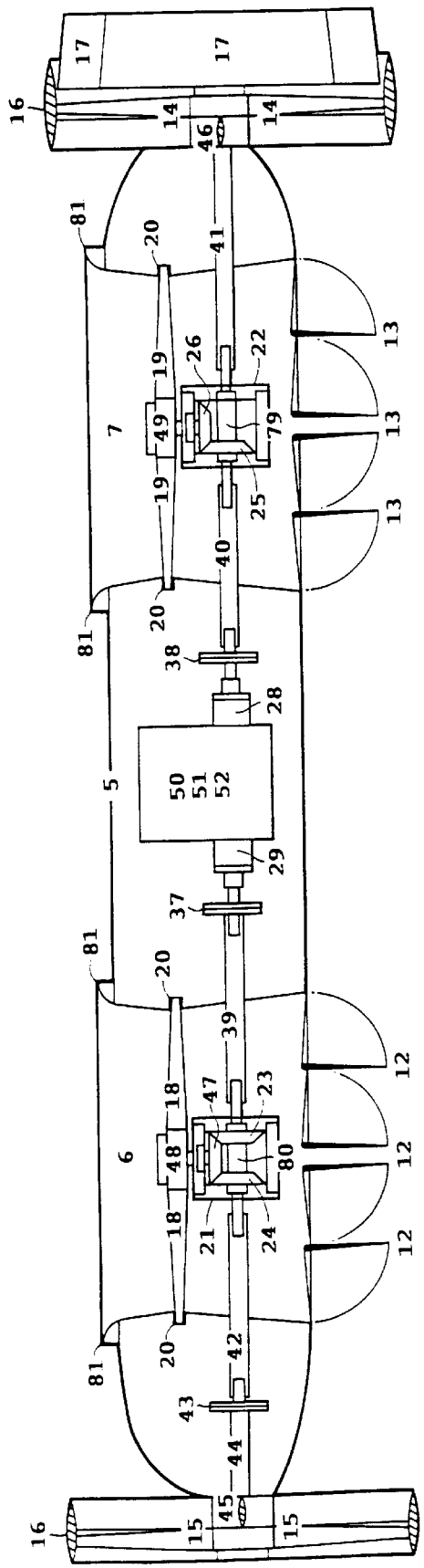
FIG. 3 depicts a stand alone attribute of the invention employing a twin axis gyroscopically controlled flying apparatus comprised of a integrated propulsion and drive train capable or both horizontal and vertical flight with a VTOL launching ability affording the use thereof singularly in non-aviation applications in the depicted configuration when integrated with the semiautonomous flight director device of FIG. 2; or for manned or unmanned aviation applications when integrated into an aircraft in a similar fashion shown in FIG. 1.

Vertical lift anti thrust is provide by two, horizontally mounted, permanently affixed, grooved, ducted propfan devices 6 and 7. The ducted fans are longitudinally placed and attached to an aircraft fuselage such as shown in FIG. 1 or alternatively in a suitable frame as shown in FIG. 3 in non-aircraft applications; each being stationed at equal distances, one 7 aft and one 6 forward of the apparatuses/aircraft's center of gravity.

The aforesaid vertical thrusting ducted fans 6 and 7 are constructed or a circular duct having an annular opening at the top for inlet air flow and an inlet lip 81 attached thereto having a radius for smooth inlet airflow.

The circular sides of the ducts 6 and 7 extend downwards from the top thereof at a twelve degree slope angle as measured from the top opening of said duct to a point thirty percent down the length thereof at which point the diameter of the duct is proportionately smaller Than at the top of the inlet opening.

Coincident at the thirty percent length of ducts 6 and 7 annular inlet walls as measured from the top opening thereof; lateral groves 20 in the circular side of the ducts are situated; the groves 20 are dimensioned so as to accommodate the outermost one inch tip of a propeller/fan blade 18 and 19 respectively. The groves allow for propeller/fan blade tip clearance for ease of centering the propeller/fan means 18 and 19 in the center of the ducts 6 and 7 and for ease of manufacturing assembly, maintenance, and repair purposes in order to eliminate the precision normally required in the placing of same.

A secondary attribute of the aforesaid groves 20 is to increase the thrust potential of a ducted fan by eliminating the loss of compressed air from escaping from the tip of the propeller adjacent to a ducts' annular side walls.

A third attribute of the groves 20 is to allow for the capture of bleed air as a result of rotational propeller action in the area of the groves to be piped to either an engine turbo charger, in the case where the power means employed is a reciprocating engine, and/or the compressed air can be piped to a holding tank of a suitable volume to subsequently be used to cool on board avionics, by way of venturi cooling.

The ducts' construction is further described as having annular airflow exhausts that extend downward the remaining seventy percent length of the ducts at a seven degree slope angle as measured from the bottom of the groves 20 to the bottom of the ducts 6 and 7.

The bottom of each duct is the exhaust opening thereof having a diameter somewhat larger than the diameter of the duct at the grove 20 location but somewhat smaller in diameter than the top of the duct's inlet 81.

Ducts 6 and 7 are so constructed as to have an hour glass shape as viewed from the side thereof. The hour glass shape providing for a large volume of inlet air masses to be induced axially into the duct by the propellers/fans 18 and 19 action when rotated at high rotational speeds. The combined resulting effect of the groves 20 and hour glass shape of the ducts 6 or 7 is that a large inlet air mass is induced axially and compressed at the constricted portion of the duct by propeller action and then subsequently expelled aft of the propeller at which point the compressed air expands against the exhaust walls of the ducts G and 7 providing additional lift against the duct vertically and thrust over that which would normally be expected of a ducted fan.

The aforementioned thrust is further complimented by lift as a result of the wing like shape of the ducted fans propeller/fans or rotors 18 and 19 pulling the apparatus FIG. 3 in a vertical direction.

The result of the ducts overall design provides superior disk loading qualities over that of a single open rotor of a helicopter having an equal blade area. For example, two ducted fans constructed as aforementioned each having five propeller blades such that each five bladed propeller is four feet in diameter produce greater thrust and lift than that of a helicopter having a single twent-four foot rotor blade.

A manifest conclusion of the aforementioned comparison is that the two ducted fan application would be capable of carrying more weight vertically than a helicopter having the same blade area.

The accompanying added degree of safety of the aforementioned ducted fan application FIG. 1 and FIG. 3, over that of a helicopter application or applications employing tilt rotor or tilt wing designs, is that the task of vertical flight is accomplished within a smaller space, with inherent gyroscopic roll and yaw stability, and without exposed blades.

Without exposed rotors, the possibility of propellers striking the ground, nearby objects, or ground personnel when a flying body is in close proximity thereof, is therefore, significantly reduced.

Additional safety is afforded by placing screens over the intakes of the ducted fans 6 and 7 and in front of the forward tractor propeller 15, shroud or optional duct 16.

Tile aforesaid' safety considerations become acute design criteria for unmanned aerial vehicles that are to be used for civilian commercial applications. As of the date of this application it is a Federal Aviation Administration requirement for safe operation of such vehicles and the exclusion of exposed rotors or propellers that precludes FAA UAV authorization for deployment in civilian and commercial markets.

Figure 2:
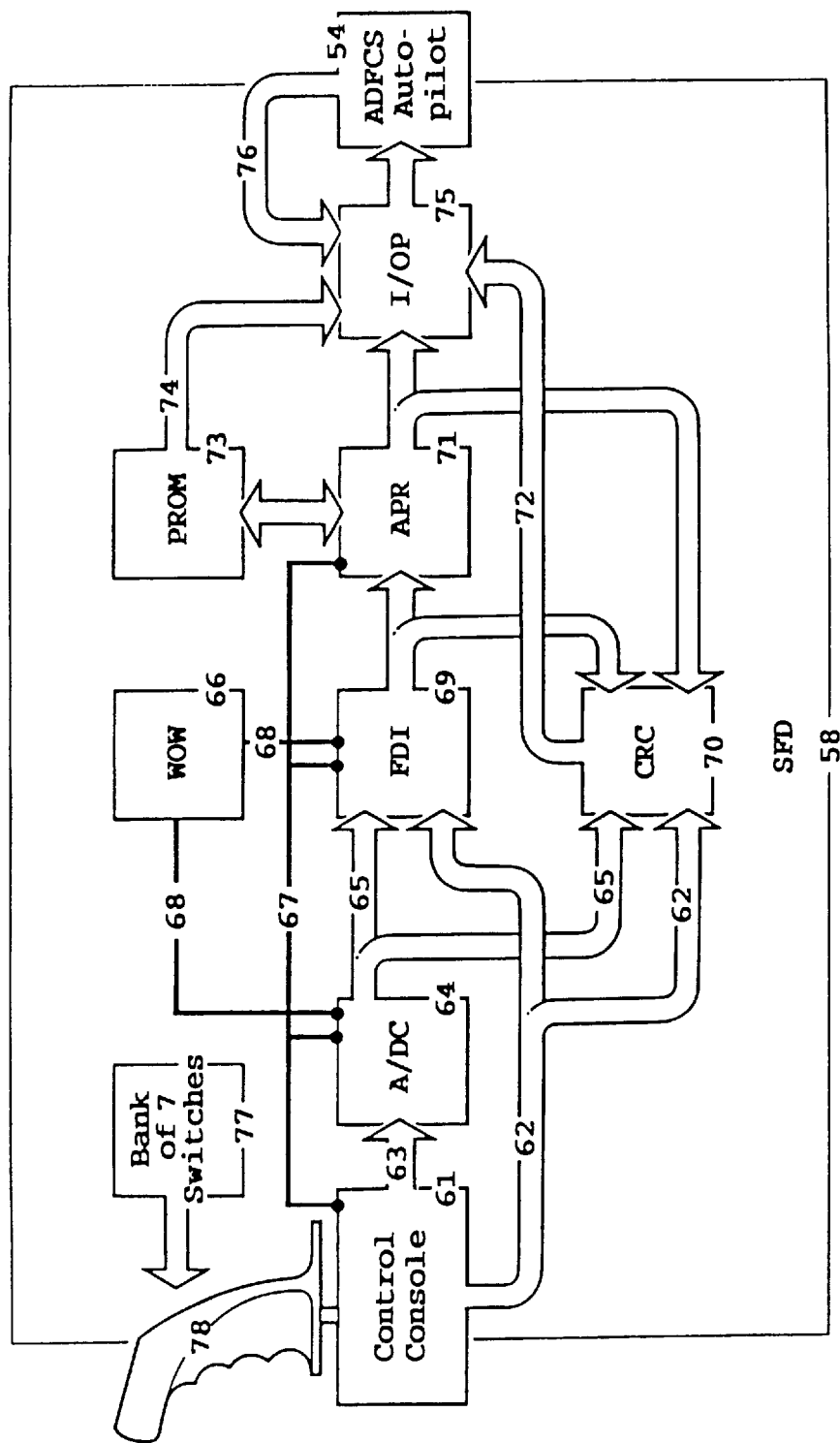
FIG. 2 depicts a functional diagram of the semiautonomous flight director device; an attribute of the invention that may be utilized alone when employed with a autopilot having a autonomous digital flight control system (ADFCS) to provide semiautonomous operation of any aircraft allowing for the unskilled piloting thereof.

To further enhance safety, reduce pilot work load and to provide a means by which a unskilled operator may direct and navigate; (1) any unmanned aerial vehicle having: an appropriate ground control station (GCS) 57 employing a duplex radio frequency data link 82 and data link transceivers 55 embodied in both the GCS 57 and UAV FIG. 1, 55, having therein a autopilot with a autonomous digital night control system 54; or (2) the flying apparatus of FIG. 3 as disclosed herein in a stand alone application; or (3) any aircraft, helicopter, glider, etc., that so has a autopilot with a autonomous digital flight control system; to wit:

(A) a semiautonomous flight director device FIG. 2, comprised of a spring loaded return to null position joy stick 78 embodied in a control console 61 entailing the joy stick 78 connected to an electronic bridge circuit means which provides electronic analog signals 63 analogous to the position of the joy stick 78 as a means to indicate the desired direction of the operator as to UP, DOWN, LEFT, RIGHT, FORWARD, or BACK direction or any logical combination thereof allowed by the. SFD 58;

(B) a set of seven switches 77 ergonomically located within the control console 61 and/or joy stick 78 hand grip; each switch when activated providing a electronic signals 62 and associated function interrupt signals 67 for the following operator desired functions:

SW.1 being a spring loaded, return to null, double pole, double throw type to provide for accelerate or decelerate command and interrupt signals 63;

SW.2 being a spring loaded, momentary push button, return to null, single pole, single throw type to provide return to base and interrupt signals 62 and 67;

SW.3 being a spring loaded, momentary push button, return to null, single pole, single throw type to provide an auto land and interrupt signals 67 and 62;

SW.4 bring a spring loaded, momentary push button, return to null, single pole, single throw type to provide hover command and interrupt signals 67 and 62;

SW.5 being a non return to null, manual, single pole, single throw, safety type to provide normal shut down and interrupt signals 67 and 62;

SW.6 being a non return to null, manual, single poll, single throw, secured safety, type to provide emergency shutdown/deploy chute/activate beacons and interrupt signals 67 and 62;

SW.7 being a spring loaded, momentary push button, return to null, single pole, single throw type to provide auto flight function and interrupt signals 67 and 62; and SW.66 a external switch installed in a suitable location on a aircraft to sense a weight on wheels (WOW) condition which provides an electronic signal 68 that informs the flight director interpreter processor (FDI) 69 that the aircraft FIG. 1 or apparatus FIG. 3 is on the ground or airborne;

(C) a electronic analog signal 63 to digital signal 65 converter circuit (A/DC) 64 to convert analog signals 63 from the joy stick 78 to discrete digital signals 65 for use by the FDI 69 processor to produce resultant discrete night function and direction codes;

(D) a electronic flight direction interpreter (FDI) processor 69 comprising a microprocessor, read only memory (ROM), and logic circuits together which interprets the converted joy stick analog to digital electronic signals from the A/DC circuit 64, and WOW switch 66 signal, and control console 61 function switches 77 signals and converting said signals to non-linear discrete digital flight function code signals for input to the autopilot redirector processor 71 circuit;

(E) a autopilot redirector (APR) processor 71 comprising a microprocessor, RAM memory and logic circuits which collates and processes in a logical program formatted for a autopilot, the digital output flight function code signals of the FDI processor 69 to provide resultant formatted flight direction and/or redirection reprogramming of the autopilot 54 in order to effectuate the SFD allowed direction or function specified by a unskilled operator. The APR 71 decodes the FDIs' interpretation code signals Of the pilots desired direction, speed, or other allowable functions and compares the pilots direction/function request with the allowed autopilot flight direction/function control laws stored in the programmable read only memory (PROM) 73. When the requested flight direction/function matches a pre-approved flight direction/function in memory 73, the APR 71 processor translates the code to a valid reprogram code formatted to be recognized by the model of autopilot employed and then transfers the autopilot flight redirect signals to the I/OP 75 for direct reprogramming of the autopilot' 54 autonomous flight control reprogram command register accordingly;

(F) a programmable read only memory (PROM) 73 having appropriate software unique with respect to the flight laws of the particular type of aircraft/flying apparatus application and specific brand or manufacturers type of autopilot digital flight control system employed. Said software entailing appropriate code and software routines so as to govern the APR processors' 71 output signals according to SFD direction/function codes generated by the unskilled operators directional commands with respect to the unique autopilot and digital flight control systems reprogramming format, clocking, real time input and interrupt and interface protocol reprogramming requirements.

The prom program therefore, employing appropriate flight laws of a given aircraft's flying characteristics that preclude a negative flight maneuver from being initiated by the pilot or operator;

(G) a cyclic redundancy check (CRC) processor 70 comprising a random access memory and a PROM memory containing therein identical flight laws stored in PROM 73. The CRC processes the output signals of the function switches 77 from the control console 61; the output signals of the A/DC 64; and the input and output signals of the FDT 69 and the APR 71 for input and output comparison checks of the flow of data through the SFD circuits to assure that tile unskilled operators flight direction/function commands match with the electronic digitally processed data of same when compared to the PROM 73 software likewise resident in the CRCs PROM program as determined by the APR 71 to allow execution of a preprogrammed flight maneuver by gating the APRs' 71 outputs for redirect/reprogram function commands into the I/OP 75 by way of authorization codes generated by the CRC 70/72 to the I/OP. The CRC processor will disallow the gating of a new redirect/function command from the APR to the I/OP if a match of all the inputs and outputs of the control console 61, joy stick 77, WOW 66, A/DC 64, FDI 69, and APR 71 is not made or made within pre-described timing limits specified by its' software to prevent responding to momentary inadvertent movements of the joy stick, illogical functions of flight direction for the particular and current flight mode of floe aircraft, and/or any spurious electrical conditions;

(H) a interface processor (I/OP) 75 comprising a microprocessor, RAM memory, a universal asynchronous/synchronous receiver transmitter and logic circuits which take the outputs of the APR processor 71 as authorized by the CRCs' gate signals and converts its' output to a useable protocol and format for transferring in real time the autopilot redirect commands according to preprogrammed sequenced formats stored in PROM 73 for a given autopilot and digital flight control system 54.

Additional input signals from the CRC 70/72 allows the gating of a new command into the I/OP command register from the ARP 71. Feed back input signals 70 to the I/OP from the autopilot 54/76 are process by the I/OP to assure that the command given by the unskilled operator is the command so transferred to the autopilot and that the autopilot has received the command, acknowledged its validity and is proceeding to execute the command.

Figure 6:
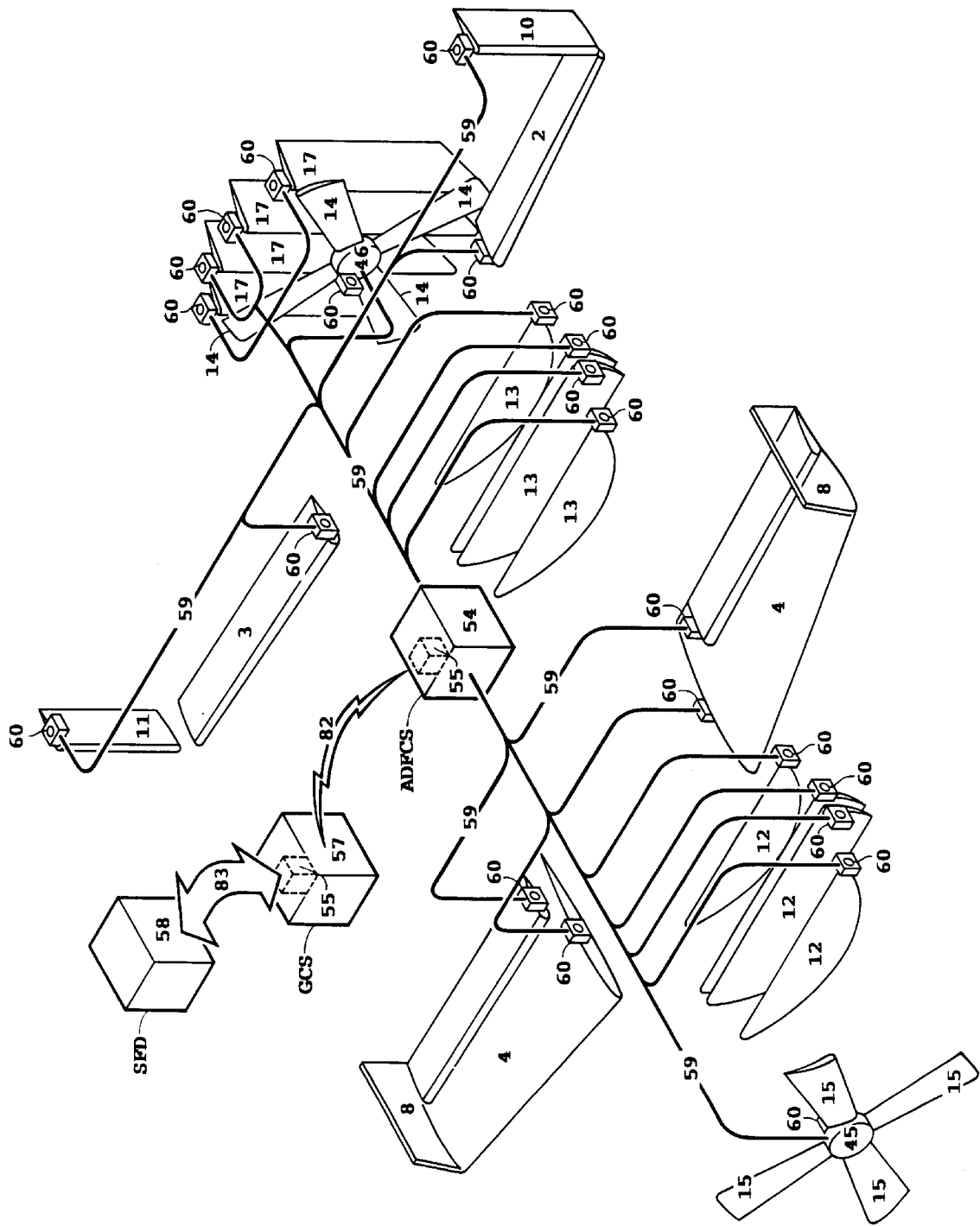
FIG. 6 depicts a SFD, to typical; GCS, to UAV, to flight controls interface.

When the SFD is employed in a UAV application or in a flying apparatus as a stand alone flying body as disclosed herein; the SFD FIG. 6 is integrated to a ground control station (GCS) 57 which provides the necessary industry standard electronics and transceiver 55 providing a duplex radio frequency data link 82 by way of a transceiver 55 on board the UAV for remotely transferring flight direction/function reprogramming of the autopilot and receiving autopilot status feedback to and from the SFD 58 and autopilot ADFCS 54 on board the aircraft.

Status signals from the autopilot and ADFCS 54/76 on the aircraft back to the SFD 58/76 in the GCS 57 is likewise by way of said duplex radio frequency data link 82 transceivers FIG. 1 , 55 and FIG. 6, 55.

When the SFD 58 is installed in a manned aircraft said interface 83 signals are directly (hard wired) without the aforesaid data link 82 and transceivers 55.

The task of the SFD when employed with a industry standard autopilot having a autonomous digital flight control system employing a differential GPS and both the SFD and ADFCS computer having appropriate corresponding flight control laws in their respective memories for a given aircraft is such that when the pilot places the joy stick in a given discrete position and/or a given discrete flight function switch is activated, the SFD circuits interprets same and generates discrete flight direction/function codes used to reprogram the autopilot accordingly, in real time, allowing therefore for continuous autopilot controlled flight of a aircraft by ADFCS means at all times for both in flight and ground operations of the said aircraft eliminating the requirement for a skilled pilot to likewise linearly displace, by way of traditional control means, a pilots' control stick and rudder pedals to the proper coordinated linear degree of displacement to effectuate the same safe and stable flight maneuvers effected by a industry standard autopilot and ADFCS as directed by the SFD, save and except any displacement of the pilots control stick and rudder pedals of such a degree that would cause a negative flight maneuver is excluded by the SFD.

The operation of the SFD when employed with a autopilot having a autonomous digital flight control system is such that the aircraft so controlled and directed by same flies at all times under the continuous direct control of the autopilot whether the aircraft is in flight executing a preprogrammed flight plan of a specific heading, altitude, airspeed and flight function or on the ground executing ground maneuver operations.

The inter-operation of the SFD with the autopilot is such that when the pilot wishes to descend, in horizontal flight mode, the pilot places the joy stick of the SFD anywhere between the eleven and one-o-clock position subsequently thereupon the SFD will generate a discrete descend flight function code to command and reprogram the autopilot to descend, in a preprogrammed manner according to ADFCS software, so as to descend under autopilot control in such a way as to avoid a negative flight maneuver during the execution of the directional command of the SFD.

The SFD will continue to command the autopilot to descend the aircraft; in a smooth, safe, and controlled manner by means of tile ADFCS software; until such lime a desired altitude is attained and the pilot releases and allows the joy stick to return to the spring loaded null position.

Once the joy stick is allowed to return to the null position the SFD will provide a direction/function redirect code to the autopilot to stop descending and maintain the altitude attained while the ADFCS maintains all other flight functions such as heading and airspeed, mode, etc. congruently.

Likewise when the pilot wishes to ascend the same aforesaid procedure is effected by the SFD when the pilot places the joy stick anywhere between the five and seven-o-clock position. Similarly the aforesaid procedure is effected by the SFD for right turns when the joy stick is placed anywhere between the two thirty and the three thirty-o-clock position; or for left turns anywhere between the eight thirty and nine thirty-o-clock position. To descend and turn right; anywhere between the one and two thirty-o-clock position; to ascend and turn right anywhere between the three thirty and five-o-clock position; to ascend and turn left anywhere between the seven and eight thirty-o-clock position; and to descend and turn left ally where between the nine thirty and eleven-o-clock position.

When the pilot wishes to perform other directions/functions singularly or coincidentally with other allowable flight directions/functions he may do so save and except for illogical flight directions/functions or combinations of same for the current flight mode or ground operations mode of the aircraft so disallowed by the SFD that could cause a illogical or unsafe flight maneuver or function of the aircraft.

If the pilot wishes to accelerate tile aircraft he or she may do so by actuating a spring loaded, auto return to null, paddle switch (SW.1) located in the fop of the joy stick tn the twelve-o-clock position with his or her thumb and the SFD will generate a function code for the autopilot to accelerate the aircraft's airspeed. The autopilot will continue to cause the aircraft to accelerate as long as the pilot so depresses the spring loaded return to null paddle switch as stated until the switch is released at which point the SFD generates a stop acceleration function code and subsequently generates a maintain airspeed function code to maintain the speed attained.

Deceleration of the aircraft is accomplished likewise by the pilot placing the paddle switch to the six-o-clock position.

In all flight modes except stationary hover flight mode when the pilot releases the paddle switch, the switch will return to the null position and the SFD will sense the pilots action and redirect the autopilot to stop acceleration/deceleration and to maintain the speed so attained.

In ground operations mode of a aircraft employing a SFD device is such that when the weight on wheels (WOW) switch (SW.6) on the aircraft is sensed by the SFD indicating that the aircraft is on the ground, the SFD will disallow certain illogical flight functions for ground operation of the aircraft such as hover, ascend, and descend etc..

In the case of ground operations such as runway taxiing of an aircraft employing the SFD; directional operations of the aircraft is such that when the pilot places the joy stick between the eleven and one-o-clock position the aircraft will be steered on the ground in the forward direction and forward movement occurs when the pilot actuates the acceleration/deceleration paddle switch (SW.1) to the twelve-o-clock position via appropriate function codes from the SFD to the autopilot.

Likewise the aircraft will reverse (back-up) on the ground when the joy stick is placed anywhere between the five and seven-o-clock position via function codes from the SFD to the autopilot. Similar steering commands are generated by the SFD for steering left and right etc. as described earlier for in-flight commands in like manner as aforementioned.

One major difference in the functional interaction between the SFD and the autopilot when the aircraft is on the ground is that the SFD does not command the autopilot to maintain the function required when the joy stick and/or acceleration/deceleration paddle switch is released for obvious reasons.

When the pilot releases the joy stick during ground operations steering directions to the autopilot are suspended and likewise acceleration/deceleration functions are suspended when accelerate/decelerate SW.1 is released to null at which point the autopilot shall idle the aircraft's engines returning them to idle and likewise the forward and aft propellers are feathered.

For take offs the aircraft is positioned by ground steering as for either a vertical take off or a horizontal take off as earlier described.

If the pilot wishes to take off horizontally in a conventional manner the pilot actuates the auto land/auto take off switch (SW.3) at which point the SFD senses the actuation of SW.3 and in sensing the WOW switch (SW.66), the SFD discerns that the aircraft is on the ground and will automatically initiate take off commands to the autopilot as opposed to any other commands other than ground steering commands.

At this point in the take off sequence the SFD causes a seven second delay to occur during which time the SFD directs the autopilot to accelerate the engine/engines RPM allowing for automatic engine run up in preparation to initiating the SFD directed the take off sequence. If within the seven second delay after the auto take off/auto land switch (SW.3) is activated and within this time the hover switch (SW.4) is sensed by the SFD as being actuated by the pilot, the aircraft's autopilot win receive vertical take off directions/functions from the SFD and the aircraft will take off vertically under autopilot control at a safe preprogrammed rate of vertical ascent without further pilot action.

When the WOW switch (SW.66) is sensed by the SFD indicating that the aircraft is airborne the pilot is allowed by the SFD to initiate in-flight directional steering and functions for auto flight hover in-flight operations, as will be defined later, at which point the aircraft may be accelerated to above horizontal stall speed. In this flight mode the SFD will automatically suspend flight direction codes for auto flight hover functions and authorize horizontal flight mode direction/function codes when the autopilots flight speed status of the aircraft is sensed by the SFD that the aircraft attained a horizontal airspeed above stall speed.

If however, the pilot wishes to take off horizontally the pilot does not actuate the hover switch (SW.4) within the seven second delay period after the pilots actuation of the auto land/auto take off switch (SW.3).

After the seven second delay time has elapsed without the hover switch being activated by the pilot the SFD will direct the autopilot to accelerate the aircraft to take off speed while allowing the pilot to steer the aircraft as for ground operations as long as the SFD senses by way of the WOW switch that the aircraft is on the ground until such time the aircraft becomes airborne in the horizontal flight mode.

At this point the WOW switch (SW.66) deactivates when the aircraft becomes airborne and upon the SFD sensing this aircraft status the SFD subsequently provides in-flight directional steering codes according to SFD allowed pilot direction to the aircraft's autopilot.

If in the case of the FIG. 1 aircraft a short horizontal take off is desired by the pilot the pilot may initiate the hover switch (SW.4) after the seven second delay period and the aircraft begins its' horizontal take off run. The SFD will sense activation of SW.4 and will subsequently initiate a sequence of redirection function codes to augment the horizontal take off sequence with vertical thrust by directing the autopilot to open the vertical lift vectoring vanes until the aircraft is airborne as indicated by the WOW switch and the SFD receives autopilot feedback that a preprogrammed horizontal airspeed is attained at which point the SFD shall suspend the vertical lift sequence and the SFD begins providing flight direction for normal horizontal flight steering and function operation to the autopilot.

If the aircraft is in the normal horizontal flight mode and the pilot initiates the hover switch (SW.4) the SFD in sensing activation of same will direct the autopilot to slow the aircraft down and a vertical flight mode direction sequence is provided to the autopilot. As the SFD senses by way of autopilot feed back status that the aircraft is approaching horizontal stall speed the SFD shall provide direction to the autopilot for full vertical flight direction to continues to slow the aircraft until a stationary hover of the aircraft is attained.

At this point during hover flight the SFD directs the autopilot to allow only heading steering of the craft and/or altitude changes while in the hover mode. Functions such as accelerate or decelerate are suspended by the SFD in this mode.

During the hover flight mode if the pilot places the joy stick anywhere between the eleven and one-o-clock position the SFD will direct the autopilot to descend the aircraft at a preprogrammed rate until a desired hover altitude is attained and the pilot releases the joy stick. Upon sensing the joy stick in the null position the SFD directs the autopilot to maintain the altitude attained.

Likewise a similar sequence of SFD commands are executed for ascending during stationary hover flight by the pilot placing the joy stick anywhere between the five and seven-o-clock position. Likewise placing the aircraft at a different heading during stationary hover flight is accomplished by placing the joy stick in the appropriate clock position as for changing headings in the horizontal flight mode.

If however, the pilot wishes to navigate the aircraft during the hover mode and the pilot does not wish to stay in the stationary hover mode the pilot may actuate the auto flight switch (SW.7) at which point in sensing SW.7 activation the SFD directs the autopilot to maintain hover flight but also allow steering and function as with horizontal flight except the aircraft's speed is maintained by the SFD from anywhere between stationary hover to just below horizontal flight stall speed as determined by the pilot via the accelerate/decelerate paddle switch.

When the aircraft is in the non-stationary hover auto flight mode the SFD allows the pilot to accelerate up to, and just under, horizontal flight stall speed or decelerate the speed at which the aircraft hovers down to stationary hover with directional steering allowed by the SFD as in the horizontal flight mode.

If the pilot wishes to resume normal horizontal flight and transition from auto flight hover mode the pilot actuates the hover switch (SW.4) a second time and the SFD will direct the autopilot accordingly and the SFD directs the aircraft's autopilot to accelerate the aircraft's auto flight lover speed to above horizontal flight stall speed.

At this point all hover flight modes are automatically suspended by the SFD at which point the SFD and autopilot resume horizontal flight direction and functions.

For vertical landings the pilot directs the aircraft via the SFD and autopilot to an area desired for a vertical landing and immediately prior to the final approach, the pilot activates the hover switch (SW.4) and within seven seconds the pilot activates the auto flight switch SW.7 at which point the SFD allows direction by the pilot to auto flight hover the aircraft to the exact position for a landing.

When the aircraft is slowed to a stationary hover and is in position for the vertical landing the pilot activates the auto land switch (SW.3) at which point the SFD senses SW.3 and the WOW switch (SW.66) and directs the autopilot to start a slow vertical descent for a vertical landing without further pilot action.

Upon landing the WOW switch becomes activated and upon the SFD sensing same disallows a flight direction and ground maneuvering functions of the aircraft may be initiated by the pilot as aforementioned described.

The aircraft may then be ground taxied to a desired location and upon actuation of the shutdown switch (SW.5) the aircraft's autopilot is directed by the SFD via the autopilots' autonomous flight control system to shut off all power and turn off the engine or engines.

For horizontal landings the pilot directs the position of the aircraft as usual for horizontal flight mode and after the base leg and alignment with the runway on final approach the pilot actuates the auto flight switch (SW.7) and within seven seconds the auto land/take off switch (SW.3) at which point the WOW switch (SW.66) is sensed and the SFD directs the autopilot to initiate a preprogrammed horizontal landing night sequence.

The autopilot will subsequently slow the aircraft to landing speed and maintain a slow steady landing descent. The SFD in this mode allows the pilot to make adjustments in steering anti rate or descent within specified preprogrammed limits as allowed by the ADFCS software.

However, the SFD in this mode will disallow flight functions to the autopilot that would cause a stall during the horizontal landing sequence.

Upon landing the WOW switch (SW.66) is sensed by the SFD and subsequently directs the autopilot to idle the engine or engines at which point the SFD allows the pilot to ground steer the aircraft via autopilot control and shutdown functions as earlier described.

When the aircraft is in the horizontal flight mode and the pilot wishes the aircraft to fly autonomously a preprogrammed mission and flight regime, resident in the autonomous digital flight control computer, the pilot may do so in this mode by actuation of the auto flight switch (SW.7). After a seven second delay, and no other flight function is activated by the pilot during this time, the SFD will direct the autopilot to enter this preprogrammed flight mission program and the aircraft will assume autonomous flight according to the said program resident in the ADFCS computer. The aircraft will then assume the preprogrammed headings, altitudes, flight modes, airspeeds, and way points, etc., according to the resident program.

If for some reason the aircraft's radio frequency data link transceiver is out of range of the ground control stations' (GCS) radio frequency data link transceiver, which in the case of SFD operation in a unmanned aerial vehicle application; the autopilot, in not sensing any status link with the SFD for a predetermined amount of time as determined by the ADFCS computers resident software; will optionally enter into the autonomous auto flight mode or alternately initiate a return to base preprogrammed flight regime resident in the autonomous digital flight control computers memory.

In the return to base mode the aircraft's autopilot assumes a flight path back to the base where the GCS is resident until the radio frequency datalink is reestablished between the SFD and autopilot at which point the SFD suspends the return to base flight mode and allows direction of the craft by the pilot or is allowed to continue to return to base at the pilots' discretion by the pilots' activation of the return to base SW.2.

The aforesaid options, in the aforestated case of a lost link scenario, must be decided upon prior to the flight mission and the appropriate option program selected and preprogrammed into the autonomous digital flight control computers memory prior to a flight mission.

Notwithstanding a lost link scenario, the pilot way initiate at any time during autonomous or semiautonomous flight modes a return to base direction function code to the autopilot; providing however, the aircraft is within radio frequency data link range of the GCS; via the SFD by the actuation of the return to base switch (SW.2) on the SFD's console 61 which shall cause the SFD to redirect the autopilot to initiate the ADFCS computers preprogrammed return to base, (location of the GCS), program.

If for some reason the SFD receives a night status back from the aircraft's autopilot that the aircraft has encountered a negative flight maneuver or some other in-flight incident or status not conducive to safe operation; either the SFD and/or the autopilot may automatically initiate emergency shut down procedures; in the case of a low Reynolds UAV applications; to accomplish such tasks as shutting off all engines, terminating all flight functions, deploying a emergency recovery parachute and activating any locating beacons such as; visual light beacons, audio sound beacons, and/or a radio frequency locator beacon, to aid ground crews in locating and recovering the aircraft after the mishap.

Additional function switches may be added to the SFD as desired by the user to effectuate additional preprogrammed function/direction for the aircraftsuch as releasing on board stores at predetermined times, or scenarios, or to conduct other on board functions as may be desired by the user.

The integrated propulsion and drive train FIG. 3 comprised of a forward and aft engine power coupling means 37 and 38; forward and aft power means drive shafts 39 and 40; forward and aft ninety degree vertical and horizontal propulsion drive transmissions 21 and 22; forward and aft collateral horizontal propulsion drive shaft means 42, 44, and 41; forward and aft electro-mechanically actuated swash plate apparatus 45 and 46; optional flywheel 43; employed only when the optional forward horizontal propulsion tractor propeller/fan 15 is not employed.

The aforesaid integrated propulsion drive train apparatus when incorporated as shown in FIG. 3 and further incorporated as shown in FIG. 1 and to which is further incorporated with the SFD 58 device of FIG. 2 with any commercial autopilot employing a autonomous digital flight control system means 54 by way of a GCS 57 and transceivers FIG. 1/55 and FIG. 6/55 employing a radio frequency data link means 82; together with vertical lift and thrust devices 6 and 7; horizontal thrust means 15 and 14; pitch control means 12 and 13 together with electro-mechanical means 59 and 60; comprises the HOVTOL UAV of FIG. 1.

The integrated propulsion and drive train FIG. 3 when incorporated into the aforementioned flying body apparatus FIG. 1 and constructed in a manner, design and configuration as shown in FIG. 1 and FIG. 3 so as to effect contiguously and congruently a combined operation that when the power means 50, or 51, or 52 rotates counter clockwise, coincident rotation occurs in the coupling means 37 and 38 and drive shaft means 39, 40, 41, 42, and 44;

48 which in turn causes the rotation of the primary drive gears 23 and 25 respectively of the forward and aft vertical/horizontal propulsion transmission means 21 and 22.

The aforesaid actions shall cause the vertical lift/thrust propellers 18 and 19 to counter rotate providing inherent gyroscopic roll control at high rotational speeds and simultaneously provide vertical lift and thrust.

The aforesaid forward ninety degree propulsion transmission 21; having unlike the aft transmission 22; a secondary drive gear 24 that turns in the opposite direction of the primary gear 23 thereof. As the primary gear 23 turns in a counter clockwise direction, the same in turn, causes the propeller drive gear 47 to cause coincident clockwise rotation of the secondary drive gear 24 of the forward drive transmission 21 which in turn causes clockwise rotation of the forward collateral horizontal propulsion drive shafts 42 and 44 thus imparting coincident clockwise rotation to the forward horizontal thrust propeller 15. Likewise the aft transmission 22 primary drive gear 25 in so rotating as aforementioned in a counter clockwise direction thus simultaneously causing the aft collateral horizontal drive shaft 41 to also rotate counter clockwise which in turn shall cause the aft horizontal propulsion propeller 14 to rotate in a counter clockwise direction opposite the clockwise rotation of the forward propeller 15 so as to cause inherent gyroscopic stabilization in the yaw axis of the apparatus at high rotational speeds while providing simultaneous horizontal thrust.

Figure 4:
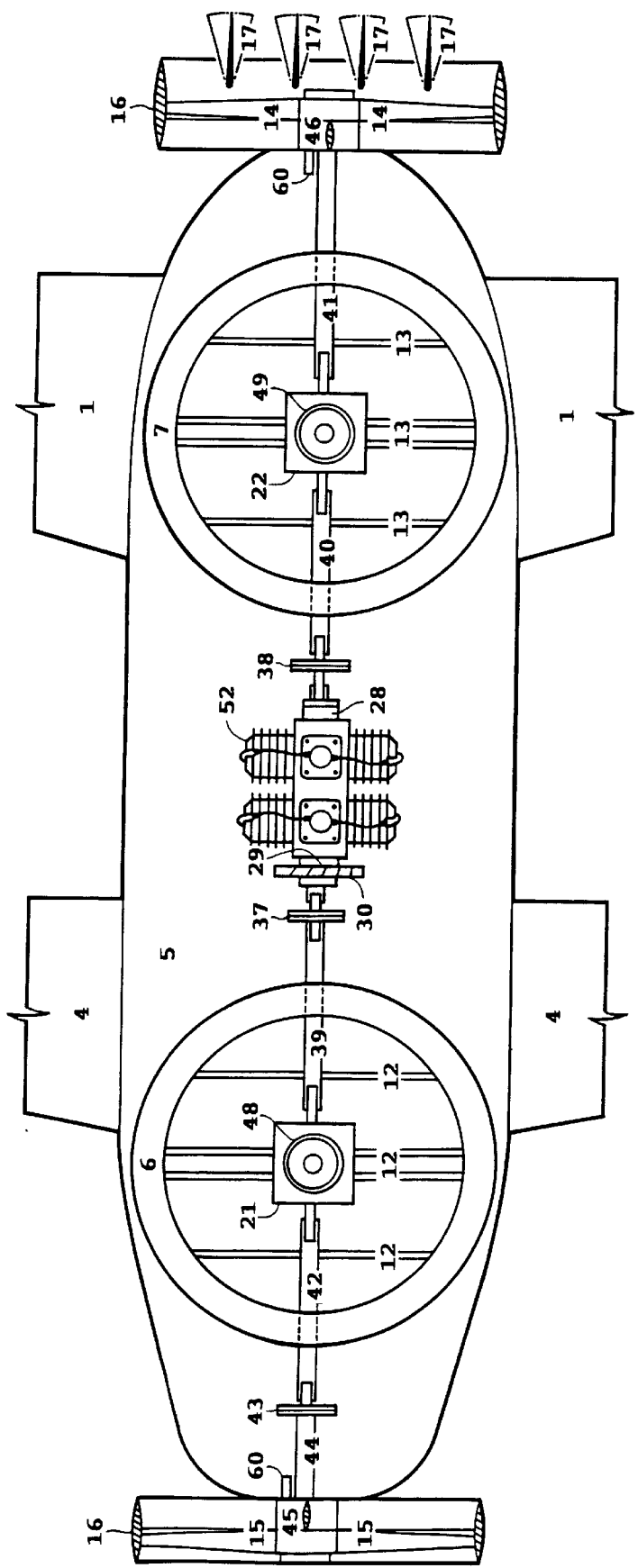
FIG. 4 depicts a single engine power means configuration as may be employed in the flying apparatus as depicted in FIG. 3, or a manned or unmannedaviation application as depicted in FIG. 1.
Figure 5:
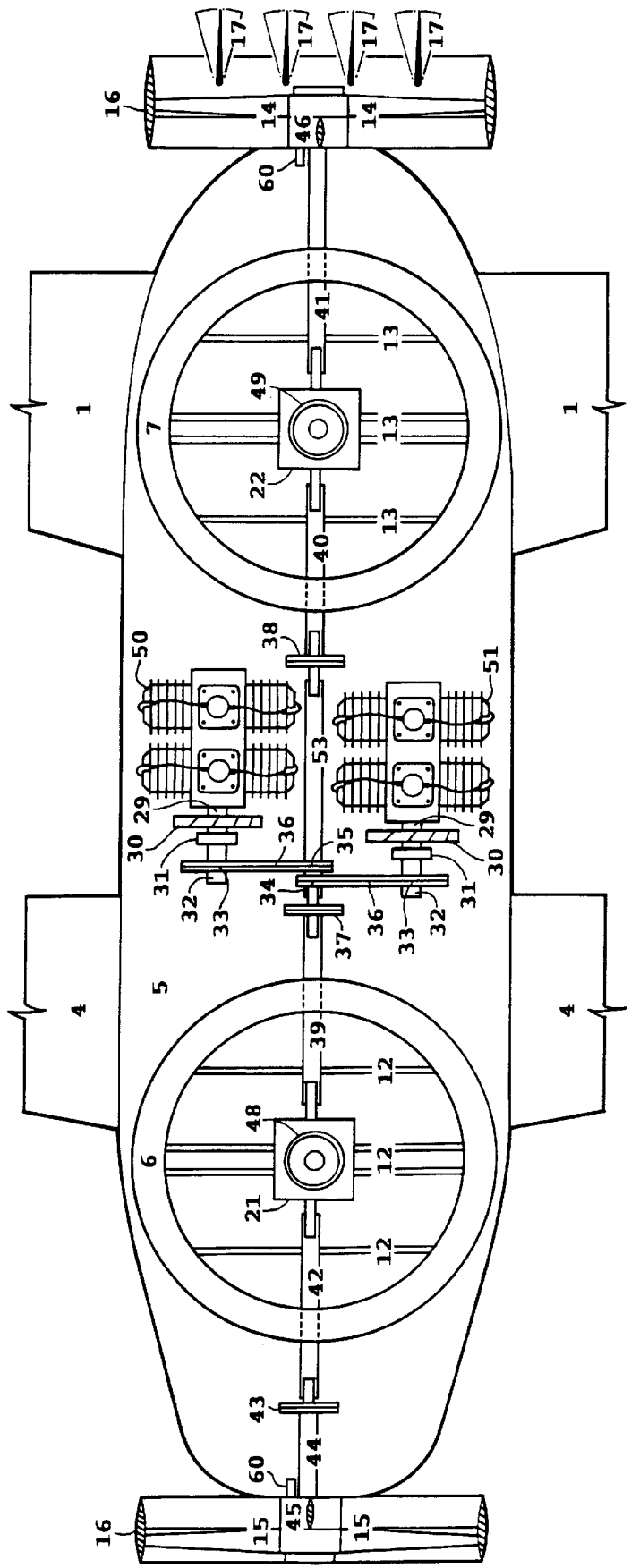
FIG. 5 depicts a dual engine power means configuration as may be employed in a flying apparatus as depicted in FIG. 3, or a manned or unmanned aviation application as depicted in FIG. 1.

A triad of power means configurations is afforded the apparatus as shown in fIG. 4 and FIG. 5 and more specifically described in the following three configurations, to wit:

(1) A twin engine power means configuration of FIG. 5 allows for either engine 50 or 51 to be selected by horse power rating such that only one of the two engines shall have sufficient horse power singularly as to afford sufficient power to sustain all vertical lift and/or horizontal thrust requirements for the apparatus so as to allow for a single engine failure without interruption of a flight mission. In this configuration both engines singularly have enough power to perform all vertical and horizontal flight functions without vertical or horizontal flight interruption due to a single engine failure or if one engine is selectively shut down in flight.

(2) A variation of the aforesaid configuration (1) of FIG. 5; both engines 50 and 51 jointly have sufficient horse power to sustain all vertical and horizontal flight functions. However, unlike configuration (1) a single engine failure of this second configuration scenario only allows for sustained horizontal flight in not having sufficient horse power to provide for vertical lift. This second configuration allows however, for the flying and landing of the aircraft in the horizontal flight mode if the apparatus is employed in an aircraft such as shown in FIG. 1 allowing for horizontal flight mission continuation abbreviated by a loss of vertical night capabilities due to a single engine failure.

(3) The third configuration shown in FIG. 4; a single engine 52 is employed having sufficient horse power singularly to sustain both vertical and horizontal flight modes. In this configuration however, a engine failure requires immediate landing by gliding if such a configuration is employed in an aircraft as shown in FIG. 1.

The aforesaid configurations (1) and (2) of FIG. 5 having a duality of power means 51 and 52 each having crank shaft drive hubs 29 attached thereto. Attached to the drive hubs 29 a engine cooling fan means 30; said drive hubs 29 having also connected thereto forward of said cooling fan means 30 a centrifugal clutch means 31 employing a electro-magnetic override capability therein. The aforementioned clutches 31 are commercial devices that provide normal operation as a centrifugal clutch when the electro-magnetic means is deactivated (clutch engaged).

In other words deactivation meaning that the electromagnetic means of the clutch is not activated (clutch engaged) by an electric current flow through the devices' electro-magnet. The clutches engaged, (not activated), operation is as a normal centrifugal clutch. When electrical current flows through the electro-magnets the clutches are activated (disengaged) and therefore mechanically disengaged and the clutches can not operate as a centrifugal clutch regardless of the amount of centrifugal force available at the clutch.

The aforesaid drive hubs 29 are also connected to a automatic adjustable belt tension toothed pulley means 33 forward of the clutch means 31. The dual power means 50 and 51 is configured and attached to a fuselage or suitable frame 5 as to be so placed parallel to, and adjacent of the drive means 53; with said engine means 50 being placed on the one side of the drive means 53 and said engine means 51 being so placed on the opposite side thereof, so as to be likewise adjacent to said drive means 53.

Drive means 53 having two, toothed pulleys 34 and 35 attached to drive means 53 so as to provide a means of transferring rotation under power to said drive means 53 by way of elastic toothed drive belts 36.

Engine power means operation is accomplished by first electrically activating (disengaging) both clutches 31 to engines 50 and 51 and subsequently starting either one or both engines.

In the case or a single engine start; electrical deactivation and subsequent mechanical engagement of the centrifugal clutch associated with the engine running shall cause the clutch so deactivated (engaged) to couple, by way of centrifugal force, the running engines' rotational power to the associated drive belt 36 which in turn will cause rotation of the drive means 53.

Subsequently deactivating and engagement of the second clutch shall likewise cause rotation from the drive means 53 to be imparted to the second engine by way of the latter deactivated and engaged clutch and associated toothed drive belt 36 causing the second engine to rotate and subsequently to start when the ignition is turned on.

When both engines 50 and 51 are running and driving the drive means 53; differences in revolutions per minute between the two engines while in operation are resolved to within four revolutions per minute by the engines' electronic ignitions with resolution of the remaining four revolutions per minute being resolved by the combined mechanical action of the self adjusting tension pulleys and the deactivated and engaged centrifugal clutches' allowable slippage.

In power means configuration (1), when employed in an aircraft application, one engine may be selectively shut down, after take off and a safe altitude is attained, to conserve fuel by activating and disengaging the clutch associated with the engine to be shut down and subsequently turning off the associated engine's ignition. Restarting the said engine while in flight is accomplished in the same manner as a single engine start as aforementioned.

In the aforementioned power means configurations (1) and (2) whereas both engines are initially operational and a subsequent single engine failure occurs, the rotation of the failing engine either ceases altogether or is so significantly reduced, as to cause an automatic disengagement of the engine from the drive means by the normal action of the deactivated (engaged) centrifugal clutch associated with the failing engine allowing continued full operation for both VTOL and horizontal flight in the case of engine configuration (1) and continued horizontal flight in the case of engine configuration (2).

Power means configuration (3) of FIG. 4 allows for single engine operation whereas a single engine power means 52 is in line with, congruous of, and contiguous to, the drive means 39 and 40. The engine 52 is attached to a fuselage or suitable frame 5. The engine power means 52 is connected to the forward drive shaft 39 by way of a forward drive hub 29 and the aft drive hub 28 with the aft drive shaft 40. The forward drive hub 29 being connected to a fan cooling means 30. The aft drives hub 28 is connected by an aft coupling means 38 and aft drive shaft 40 and subsequently to the aft ninety degree drive transmission 22 and aft collateral drive shaft 41. The forward drive hub 29 is further connected forward of the fan cooling means 30 and subsequently to a forward coupling means 37 and to the forward drive shaft means 39 which is connected to the forward ninety degree drive transmission 21 and subsequently to the forward collateral drive shafts 42 and 44.

In all of the aforementioned engine configurations (1), (2), and (3); operation action of the engines as an integral function of the integrated propulsion drive train apparatus is as disclosed earlier in this application.

The HOVTOL UAV FIG. 1 may also function with engine configurations (1), (2), or (3) as a conventionally flown, horizontal take off and landing, autonomous/semiautonomous UAV, without VTOL capabilities when deployed less the vertical lifting means 6 and 7 and ninety degree propulsion drive transmissions 21 and 22 when incorporating the wings 1; canards 4; vertical stabilizers 9; aerodynamic control surfaces 2, 3, 8, 10, 11, and 17; horizontal propulsion means 14 or alternately 15; and the semiautonomous flight director device 58, when enjoined by an autopilot having a autonomous digital flight control system means 54; electro-mechanical means 59 and 60; radio frequency data link means 82; data link transceivers 55; ground control station means 57; and a power means 50, 51, or 52. The horizontal flying UAV variant of FIG. 1, having such a configuration and design capable of affording the commercial use thereof by an unskilled operator safely.

The apparatus of FIG. 3 may also function in a stand alone configuration as a VTOL/hover flying body when embodied in a suitable frame for a number of non-aviation applications. The apparatus of FIG. 3 having such design, construction, and configuration as herein earlier described so as to afford the commercial operation and use thereof, as a stand alone VTOL flying apparatus, by an un skilled operator safely.

The aforementioned semiautonomous flight director device of FIG. 2 may also function in stand alone applications independent or the apparatus of FIG. 3 or the FIG. 1 UAV as disclosed herein when the SFD device is appropriately interfaced to any compatible, commercially available, autopilot having a autonomous digital flight control system and the combination thereof thus affording the operation of any aircraft so equipped; whether said aircraft is a helicopter, airplane, glider, VTOL aircraft, etc.; by an unskilled pilot safely.

It is claimed:

1. An aircraft comprising: a body having a front end, a rear end, two opposite facing sides, a top end, and a bottom end, a longitudinal axis extending between said front and rear ends, front and rear openings extending through said body transverse to said longitudinal axis and between said top and bottom ends, front and rear ducts defining said front and rear openings respectively with each of said ducts having top bottom ends, front and rear propeller means located in said front and rear openings for rotation about the front and rear axes respectively transverse to said axis, drive means extending along said longitudinal axis and coupled to said front and rear propeller means for rotating said front and rear propeller means in opposite directions to provide lift, and movable vanes located in line with said front and rear openings below said front and rear propellers for controlling the direction of air flow from said front and rear openings, said vanes extending in directions transverse to said longitudinal axis and transverse to said front and rear axes respectively at least one of said vanes is located below said front propeller means near an extension of its axis and has a length nearly equal to the maximum diameter of said front annular duct, at lease one of said vane is located below said rear propeller means near an extension of its axis and has a length nearly equal to the maximum diameter of said rear annular duct.

2. The aircraft of claim 1, wherein each of said ducts have top and bottom ends with an inside diameter which decreases from its said top end to a smaller diameter portion at a position intermediate said top and bottom ends and then increases from said smaller diameter portion to its said bottom end.

3. The aircraft of claim 2, comprising annular slots in said ducts at its said smaller diameter portions for receiving the outer edges of said propeller means located in said openings of said ducts respectively.

4. The aircraft of claim 1, comprising: power means, said drive means comprises: first and second shafts having first ends coupled to said power means for rotating said first and second shafts in a given direction with respect to said longitudinal axis, said first shaft having a second end coupled to a forward gear, said front propeller means having a gear coupled to said forward gear for rotating said front propeller means in a first direction relative to its axis, said second shaft having a second end coupled to a rear gear, said rear propeller means having a gear coupled to said rear gear for rotating said rear propeller means about its axis in a direction opposite to that of said first direction.

5. The aircraft of claim 1 comprising: a pusher horizontal thrust propeller means located at said rear end of said aircraft and coupled to said drive means for rotation for providing horizontal thrust for use in moving said aircraft in a forward direction with said front end forward of said aircraft.

6. The aircraft of claim 5 comprising: power means, said drive means comprises: first and second shafts having first ends coupled to said power means for rotating said first and second shafts in a given direction with respect to said longitudinal axis, said first shaft having a second end coupled to a forward gear, said front propeller means having a gear coupled to said forward gear for rotating said front propeller means in a first direction relative to its axis, said second shaft having a second end coupled to a rear gear, said rear propeller means having a gear coupled to said rear gear for rotating said rear propeller means about its axis in a direction opposite to that of said first direction, a third shaft having a first end coupled to said second end of said second shaft for rotation in said given direction and a second end coupled to said pusher horizontal thrust propeller means for rotating said pusher horizontal thrust propeller means in said given direction, front and rear wings fixedly coupled to said aircraft, and vertical stabilizers coupled to said rear wing.

7. The aircraft of claim 6, comprising: a forward horizontal thrust propeller means located at said front end of said aircraft for providing horizontal thrust for use in moving said aircraft in said direction, a fourth shaft having a first end coupled to said forward horizontal thrust propeller and a gear coupled to a second end which meshes with said gear of said front propeller mean for rotating said forward horizontal thrust propeller in direction opposite the direction of rotation of said pusher horizontal thrust propeller means.

8. The aircraft of claim 4, comprising: coupling means for coupling said first ends of said first and second shafts together such that rotation of said coupling means in said given direction rotates said first and second shafts in said given direction, said power means comprises first and secondary rotary engines coupled to said coupling means by way of first and second clutches respectively such that each of said first and second clutches may separately engage or disengage its engine from said coupling means.

9. The aircraft of claim 5, comprising: a forward horizontal thrust propeller means located at said front end of said aircraft for providing horizontal thrust for use in moving said aircraft in said forward direction, a fourth shaft having a first end coupled to said forward horizontal thrust propeller and a gear coupled to a second end which meshes with said gear of said front propeller means for rotating said forward horizontal thrust propeller in a direction opposite the direction of rotation of said pusher horizontal thrust propeller means.

10. The apparatus of claim 1, wherein:

said bottom ends of said ducts are substantially free of structure except for said vanes.

* * * * *